Patented Mar. 19, 1946

2,397,050

UNITED STATES PATENT OFFICE 2,397,050

SYNTHETIC RUBBER COMPOSITION

Donald V. Sarbach, Cuyahoga Falls, Ohio, assignor to The B. F. Goodrich Company, New York, N. Y., a corporation of New York No Drawing. Application March 1, 1944, Serial No. 524,628

5 Claims. (Cl. 260—42)

This invention relates to improved synthetic rubber compositions and particularly to compositions suitable for use as tire treads, comprising a rubbery copolymer of a butadiene-1,3 hydrocarbon such as butadiene-1,3 and an aryl olefin hydrocarbon such as styrene, together with a relatively small amount of a copolymer of a butadiene-1,3 hydrocarbon and an acrylic nitrile.

Synthetic rubber of the butadiene-1,3 styrene copolymer type (i. e., rubbery copolymers of butadiene-1,3 hydrocarbons such as butadiene-1,3 and aryl olefin hydrocarbons such as styrene) is well-known to be useful as a general replacement for natural rubber and, because of its high resistance to heat and to abrasion, is the synthetic rubber ordinarily used in the production of vehicle tires. It has been found, however, that such synthetic rubber, when compounded and vulcanized in the usual manner, is not nearly so resistant to flex-cracking as is vulcanized natural rubber and that, consequently, tire treads made of such synthetic rubber crack in service much more quickly than do natural rubber treads. Moreover, it has been found that the addition to the synthetic rubber of various materials which are miscible therewith, including various softeners or plasticizers, and various compatible rubbery materials or extenders, does not generally improve its resistance to flex-cracking; rather the effect of such additions has often been to lower the strength and resistance to heat and abrasion and other desirable properties of the synthetic rubber compound.

I have now discovered that the incorporation of relatively small amounts of certain rubbery materials which are miscible with the butadiene-1,3 styrene synthetic rubber only to a very limited extent, into such synthetic rubber produces compositions having greatly improved resistance to flex-cracking as well as possessing, often to an improved extent, the other properties desired in a synthetic rubber tire tread composition. The preferred rubbery materials of this type are the copolymers of butadiene-1,3 hydrocarbons and acrylic nitriles, and it is with the use of such materials in butadiene-1,3 styrene synthetic rubbers in small proportions, as will hereinafter be explained, to produce such improved compositions, that this invention is concerned.

As an example of a preferred composition in accordance with this invention, a composition suitable for use in tire treads is prepared by admixing the following ingredients on a two-roll mixing mill:

| | Parts |
|---|---|
| "GR–S" (a synthetic rubber prepared by copolymerizing 75 parts by weight of butadiene-1,3 and 25 parts by weight of styrene) | 70.00 |
| Copolymer of 40 parts by weight of butadiene-1,3 and 60 parts by weight of acrylonitrile | 30.00 |
| Channel black | 45.00 |
| Zinc oxide | 5.00 |
| Sulfur | 1.75 |
| Benzothiazyl-2 monocyclohexyl sulfenamide (vulcanization accelerator) | 1.50 |
| Paraflux (believed to be an asphalt residue from cracking crude petroleum, described in U. S. Patent 1,611,436) | 10.00 |

The composition is then vulcanized by heating in a press for 45 minutes at 280° F. The vulcanizate obtained is a strong resilient material possessing a tensile strength of 2,575 lbs./sq. in. and a 490% ultimate elongation. When a ¼" thick strip of the vulcanizate is tested for flex-resistance by means of a DeMattia type flexing apparatus wherein the strip is pierced in the center and then subjected to 300 flexures per minute at 82° F., it is found that the strip withstands over 2,000,000 flexures before its crack index is 8 on a scale ranging from 0 (no cracks) to 10 (rupture). A control composition prepared in the same manner as above except that 100 parts of the butadiene-1,3 styrene synthetic rubber and no butadiene-1,3 acrylonitrile copolymer is employed, when tested in the same manner, is found to be ruptured after only about 50,000 flexures, showing that the flex-crack resistance is increased over forty times by the presence of the butadiene-1,3 acrylonitrile copolymer. Moreover, the control composition possesses a tensile strength of only 2400 lbs./sq. in. and only 400% elongation, or less than that of the composition of this invention, thus showing that the improvement in flex resistance is effected without any decrease in physical properties. Furthermore, the composition of this invention is found to possess a Crescent tear resistance at room temperature of 39.6 as compared to 27.0 for that of the control thus showing that besides improving flex-resistance the presence of the butadiene-1,3 acrylonitrile copolymer also greatly improves tear-resistance and thereby renders the composition more suitable as a tire tread.

In another embodiment of the invention wherein 85 parts of GR–S is compounded in a tire tread recipe with 15 parts of the butadiene-1,3 acrylonitrile copolymer described above, a similar increase of flex-crack resistance of about 30 times that of a control employing 100 parts of GR–S with no butadiene-1,3 acrylonitrile copolymer, is obtained, and the vulcanized composition is found to be superior to the control in tensile strength, ultimate elongation and tear resistance. In other embodiments, other butadiene-1,3 acrylonitrile synthetic rubbers prepared by polymerizing mixtures of 55 parts butadiene-1,3 and 45 parts acrylonitrile, and 75 parts butadiene-1,3 and 25 parts acrylonitrile, are incorporated in the butadiene-1,3 styrene synthetic rubber in amounts varying from 5 to 30 parts of the butadiene-1,3 acrylonitrile copolymer to 70 to 95 parts of the butadiene-1,3 styrene copolymer, and it is found in each case that the resulting composition possesses a resistance to flex-cracking from about 4 to 40 times that of the control, the butadiene-1,3 acrylonitrile copolymers containing the larger proportions of acrylonitrile being most effective in increasing flex-resistance.

In still another embodiment a composition is prepared by admixing the following ingredients:

| | |
|---|---|
| GR–S | 95.00 |
| Copolymer of 40 parts by weight of butadiene-1,3 and 60 parts by weight of acrylonitrile | 5.00 |
| Pine tar (a softener) | 3.00 |
| Coal tar (a softener) | 4.00 |
| Stearic acid | 2.50 |
| Soft channel black | 45.00 |
| Zinc oxide | 2.50 |
| Phenyl-beta naphthylamine (age-resistor) | 0.50 |
| Benzothiazyl-2 monocyclohexyl sulfenamide (vulcanization accelerator) | 1.20 |
| Sulfur | 1.75 |

This composition together with an identical composition except that the latter contains 100 parts of GR–S with no butadiene-1,3 acrylonitrile copolymer, are then employed as the tread portions in the construction of standard 600 x 16 tires. The tires are then subjected to the standard Sprague test for crack growth and it is found at the conclusion of the test that the tires comprising the butadiene-1,3 acrylonitrile copolymer are cracked only about half as badly as the tires made from the composition not containing this copolymer. Road tests on the tires similarly show that the treads made in accordance with this invention are cracked only about half that of the control tires.

The above composition comprising the butadiene-1,3 acrylonitrile copolymer is also superior to the control composition in tensile strength and in resistance to heat build-up since, when vulcanized for 75 minutes at 280° F., it possesses a tensile strength of 2390 lbs./sq. in. (as compared to 2350 lbs./sq. in. for the control) and its temperature rise during flexing (as determined by the hysteresis test described by Lessig in Industrial & Engineering Chemistry, Anal. Ed., 9, 582, 1937) is only 63° F. (as compared to 75° F. for the control).

It is apparent from the above examples that the presence of butadiene-1,3 acrylonitrile copolymers in butadiene-1,3 styrene synthetic rubber compositions remarkably improves the flex-crack resistance and also improves the tensile strength, tear resistance and other desirable properties of the compositions, thereby rendering them such more suitable for use in many applications particularly in the manufacture of tire treads. This result is quite surprising inasmuch as the butadiene-1,3 acrylonitrile copolymers, especially those containing higher proportions of acrylonitrile than of butadiene, which are most useful in this invention, are not nearly so valuable per se as are the butadiene-1,3 styrene copolymers for the manufacture of tires. Moreover, the result is even more unexpected when it is considered that the butadiene-1,3 acrylonitrile copolymers are incompletely miscible with the butadiene-1,3 styrene copolymers and as a result do not form homogeneous mixtures therewith, since generally the admixture of incompletely miscible rubbery materials results in the formation of a heterogeneous composition less valuable than either of the materials alone.

Although the above examples illustrate preferred compositions for use in tire treads, it is to be understood that numerous modifications and variations therein may be effected while still obtaining the advantages set forth. Thus the proportions of the butadiene-1,3 acrylonitrile copolymer incorporated with the butadiene-1,3 styrene copolymer may be varied over wide limits provided however that the proportion of the former is not over about 50% by weight of that of the latter, since the use of larger proportions of the acrylonitrile copolymer produces compositions which are less valuable for tire treads than are the styrene copolymers alone. It is preferred that the amount of the butadiene-1,3 acrylonitrile copolymer be slightly (about 1 to 10%) in excess of that which is soluble in the butadiene-1,3 styrene copolymer. This amount will vary depending on the particular butadiene-1,3 acrylonitrile copolymer used but in general will be from 1 to 45% by weight based on the weight of the butadiene-1,3 styrene copolymer. More particularly, the use of from 1 to 20% by weight, based on the styrene copolymer, of butadiene-1,3 acrylonitrile copolymers in which the acrylonitrile is predominant, and the use of 10 to 45% by weight, based on the styrene copolymer, of butadiene-1,3 acrylonitrile copolymers in which the butadiene-1,3 is predominant, have been found to give best results.

Although the invention has been described with particular relation to the use of butadiene-1,3 acrylonitrile copolymers, which are the preferred materials, other equivalent copolymers may also be used. Thus any copolymer of any polymerizable butadiene-1,3 hydrocarbon, including not only butadiene-1,3 itself but also its hydrocarbon homologs such as isoprene, 2,3-dimethyl butadiene, piperylene and the like, with any polymerizable acrylic nitrile, including not only acrylonitrile but also other homologous nitriles such as methacrylonitrile, ethacrylonitrile, alpha-chloro acrylonitrile, alpha-phenyl acrylonitrile and the like, may also be used. The proportions of the butadiene-1,3 and the acrylic nitrile in the copolymer may be varied throughout the entire range, provided of course that the material used is a true copolymer (which of necessity will contain an appreciable proportion, say at least about 5 or 10%, of each constituent), but it is preferred that copolymers prepared from mixtures containing butadiene-1,3 hydrocarbons and acrylic nitriles each in proportions of from 25 to 75% by weight, be used. It is even more preferable that the proportion of the acrylic nitrile be at least 40% of the mixture, especially from 40 to 75%, with the proportion of the butadiene-1,3 varying from 25 to 60%. The presence of small amounts of other polymerizable materials in the mixture along with the butadiene-1,3 and the acrylic nitrile especially when the latter are present in their preferred proportions, is also contemplated by this invention. The copolymers may be prepared in any known manner such as by polymerization in aqueous emulsion or by homogenous polymerization.

The nature of the butadiene-1,3 styrene type synthetic rubber may also be varied. Although synthetic rubbers prepared by copolymerizing mixtures of butadiene-1,3 and styrene in which butadiene-1,3 constitutes from 50 to 90% by weight of the mixture are preferred, other copolymers prepared from mixtures of about 30 to 90% of butadiene-1,3 or of any other butadiene-1,3 hydrocarbon, with about 10 to 70% of styrene or of any homologous aryl olefin hydrocarbon containing a single vinyl group attached to an aryl group, such as p-methyl styrene, vinyl naphthalene and the like, are also rubbery copolymers and may also be used.

The incorporation of the nitrile copolymer with the butadiene-1,3 styrene synthetic rubber may be effected in any desired manner although addition on a roll mill or in an internal mixer during the compounding of the synthetic rubber is the most convenient method. After the compounded compositions are prepared they are ordinarily vulcanized by heating with sulfur or any other vulcanizing agent known to the art, but unvulcanized compositions are useful for some purposes and are also included in this invention.

Various compounding and vulcanizing ingredients including carbon black and other reinforcing agents, zinc oxide, softeners such as pine tar and coal tar, sulfur, organic vulcanization accelerators, antioxidants and the like may be included in the compositions herein described. It is especially desirable that about 10 to 90% by weight, based on the butadiene-1,3 styrene synthetic rubber, of carbon black be employed in order to impart the strength and abrasion resistance required in tire treads.

Other modifications and variations will be apparent to those skilled in the art and are within the spirit and scope of the invention as defined in the appended claims.

I claim:

1. A synthetic rubber composition comprising a rubbery copolymer of butadiene-1,3 and styrene, and about 1 to 50% by weight based on the said copolymer, of a copolymer of butadiene-1,3 and acrylonitrile.

2. A tire tread composition comprising a vulcanizate of a composition comprising a rubbery copolymer of butadiene-1,3 and styrene, and about 1 to 50% by weight based on the said copolymer, of a copolymer of butadiene-1,3 and acrylonitrile.

3. A tire tread composition comprising a vulcanizate of a composition comprising a rubbery copolymer of butadiene-1,3 and styrene and about 1 to 20% by weight based on said copolymer, of a copolymer of 25 to 60 parts of butadiene-1,3 and 40 to 75 parts of acrylonitrile.

4. A tire tread composition comprising a vulcanizate of a composition comprising a rubbery copolymer of butadiene-1,3 and styrene and about 1 to 20% by weight based on said copolymer, of a copolymer of 40 parts of butadiene-1,3 and 60 parts of acrylonitrile.

5. A synthetic rubber composition comprising a rubbery copolymer of a butadiene-1,3 hydrocarbon and an aryl olefin hydrocarbon containing a single vinyl group attached to an aryl group, and about 1 to 50% by weight based on said copolymer, of a copolymer of a butadiene-1,3 hydrocarbon and acrylonitrile.

DONALD V. SARBACH.